United States Patent [19]

Dark et al.

[11] Patent Number: 4,917,355

[45] Date of Patent: Apr. 17, 1990

[54] STOP VALVE

[75] Inventors: Richard C. G. Dark, Rancho Cucamonga; William L. Wright, Ontario, both of Calif.

[73] Assignee: Robert Manufacturing Company, Rancho Cucamonga, Calif.

[21] Appl. No.: 355,282

[22] Filed: May 22, 1989

[51] Int. Cl.⁴ .................. F16K 41/00; F16K 31/50
[52] U.S. Cl. ................................. 251/214; 251/225; 251/264; 251/330; 251/335.1; 277/206 R
[58] Field of Search ............ 251/214, 215, 221, 222, 251/223, 224, 225, 264, 265, 273, 330, 335.1, 368; 277/206 R, 207 A

[56] References Cited

U.S. PATENT DOCUMENTS

| | | | |
|---|---|---|---|
| 1,681,981 | 8/1928 | Gilbert | 251/215 |
| 1,753,833 | 4/1930 | Mueller | 251/215 |
| 2,457,472 | 12/1948 | Hofferd | 251/31 |
| 2,784,933 | 3/1957 | Newell et al. | 251/225 |
| 3,104,090 | 9/1963 | Callahan, Jr. | 251/335.1 |
| 3,132,569 | 5/1964 | Shepherd | 277/206 R |
| 3,255,775 | 6/1966 | Albro et al. | 251/215 |
| 3,327,992 | 6/1967 | Billeter et al. | 251/215 |
| 3,356,335 | 12/1967 | Koch et al. | 251/214 |
| 3,490,736 | 1/1970 | Snyder | 251/215 |
| 3,563,557 | 2/1971 | Doutt | 277/206 R |
| 3,747,894 | 7/1973 | Pepper | 251/215 |
| 3,915,428 | 10/1975 | Hastings | 251/175 |
| 4,177,971 | 12/1979 | Landamore | 251/215 |
| 4,562,994 | 1/1986 | McDonald | 251/175 |
| 4,609,177 | 9/1988 | Turner | 251/175 |

FOREIGN PATENT DOCUMENTS

| | | | |
|---|---|---|---|
| 222910 | 7/1959 | Australia | 251/215 |
| 1000129 | 2/1952 | France | 251/330 |
| 807701 | 1/1959 | United Kingdom | 251/330 |
| 924710 | 5/1963 | United Kingdom | 251/215 |

Primary Examiner—George L. Walton
Attorney, Agent, or Firm—Roth & Goldman

[57] ABSTRACT

An improved stop valve eliminates the need for O-rings and washers. The valve contains a one piece unitary stem formed of resilient compressible plastic material. The stem contains three separate seals and fits within, extends through and is moveable in a valve sleeve. Operating the handle moves the stem axially between a first axial position in which the valve is fully open and a second axial position in which the valve is fully closed. The first seal is operative to provide a seal responsive to said stem being in the first axial position, the second seal means is operative to provide a seal responsive to said stem being in the second axial position, and the third seal is operative to seal in all axial positions.

33 Claims, 1 Drawing Sheet

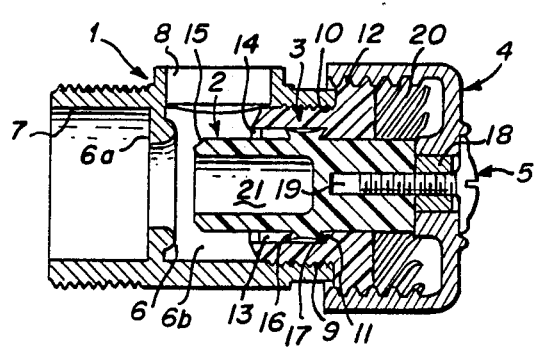
Fig_1
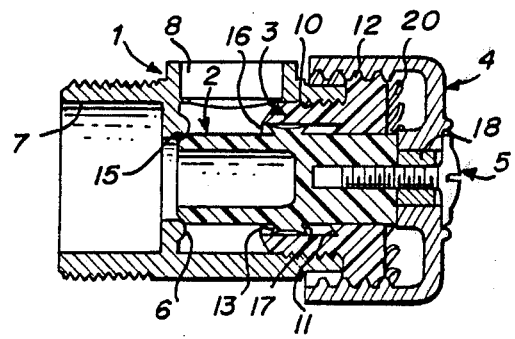
Fig_2
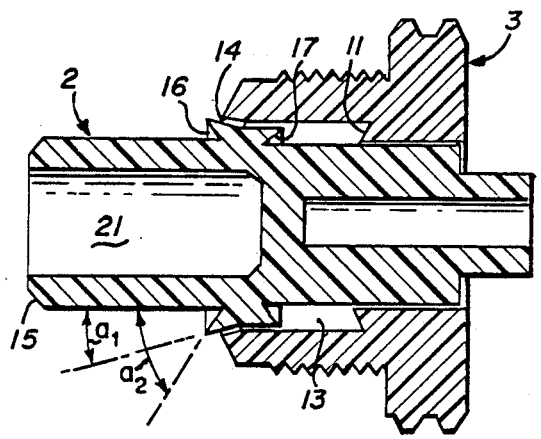
Fig_4
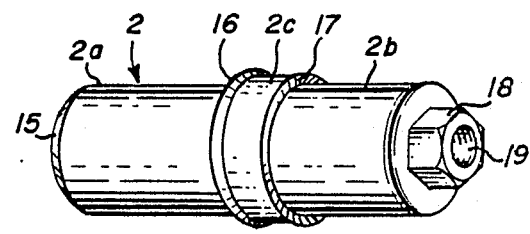
Fig_3
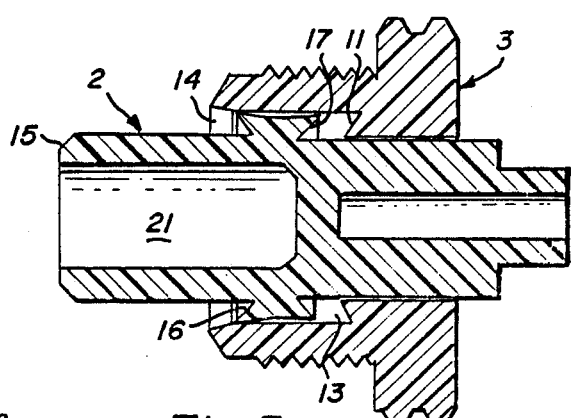
Fig_6
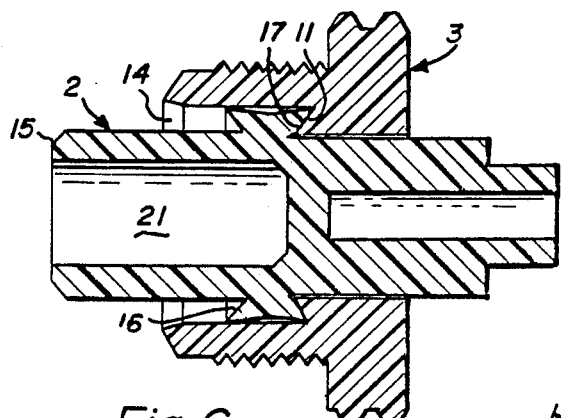
Fig_5
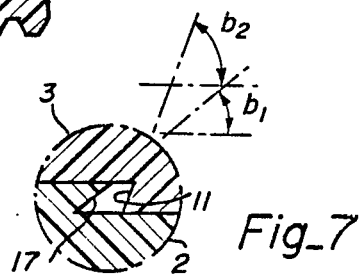
Fig_7

STOP VALVE

FIELD OF THE INVENTION.

This invention relates to stop valves and, more particularly, to washerless ring seal-less quick acting stop valves for use in water supply lines.

BACKGROUND.

Stop valves are commonly found in in-line application in the water supply lines to sinks and toilets, water appliances which are normally supplied with water. The valves are usually found under the sink or toilet basin and serve as a convenient manual "shut off". Accordingly, the stop valve is normally always in the open position, permitting water to flow through the plumbing to the sink faucets and/or toilet basin valve; and are closed only on those infrequent occasions when repairs are to be made to the water appliance. Although several designs for this type of valve are offered in the trade, the most common stop valve construction incorporates O-rings and/or washers to form a seal and, moreover, consists of as many as eight separate pieces. Though the design is tried and true, the use of so many component parts has obvious cost implications for the manufacturer and ultimately for the customer. Other stop valves of more recent design are formed of a fewer number of parts to reduce cost, as few as three pieces per assembly. These incorporate a thin rubber tubular member that contains a hole in a cylindrical side wall that is rotated to align or mis-align the opening with a water passage to thereby open or close the valve. It is designed so that when in the closed position water pressure from the main supply lines enters the hollow of the tubular member forcing the member to radially expand and create a tighter seal. Such recent stop valves are easy to activate and require as little as a quarter turn, 90 degrees, to operate from a fully open to a fully closed position. U.S. Pat. No. 4,562,994 granted Jan. 7, 1986 to MacDonald and U.S. Pat. No. 4,609,177 Sept. 2, 1986 to Turner et al illustrate this kind of valve. Unfortunately it has been learned that some numbers of such valves have been found to leak even when newly installed. While satisfying criteria for minimal component element usage and cost, those three piece type valves do not engender the degree of comfort expected by the trade from the standpoint of function, which translates simply as; no water leakage permitted.

An object of the present invention is therefore to provide an effective stop valve containing a fewer number of component elements than the common design; to produce a stop valve that is of more economical construction and, when new, does not leak. It is a further object of the invention to provide a stop valve construction that does not use O-rings or washers as seals and which allows opening and or closing in as little as a quarter turn of the handle.

SUMMARY OF THE INVENTION.

An improved quick acting stop valve according to the present invention includes a valve sleeve and a one piece unitary stem formed of a compliant compressible plastic material with the stem including three seals. The stem is fitted within, extends through and is moveable axially in the valve sleeve; and a handle is coupled to the stem. Applying a manual force in one direction to the handle moves the stem and the seals carried thereby axially between a first axial position in which the valve is fully open and a second axial position in which the valve is fully closed and vice-versa when the force is reversed in direction. The first seal is the main valve seal and seals responsive to the stem being in the first axial position, closing the valve; the second seal provides a seal responsive to the stem means being placed in the second axial position, furthermost distant from the first axial position, corresponding to the valve being fully open, and the third seal being provides a seal between the stem and sleeve in all axial positions of the stem. No. "O" rings or washers are required to seal the valve to the sleeve.

In accordance with more specific aspects of the invention the quick acting valve contains as many as five parts: the valve body, a valve stem, a sleeve, a handle and a screw with which to fasten the handle to the stem. The stem comprises a one piece elongated generally cylindrical member containing a raised band or rim like portion located at an intermediate position along the stem axis. In turn that band portion contains a lip surrounding the band portion located at one end thereof to form a forward end or third seal. The lip protrudes outwardly at an inclination to the axis of the stem. In more specific aspects the lip has a right circular conical outer surface and a right circular conical inner surface with the cone angle of the latter being larger than the corresponding cone angle of the former. At the other end of the band portion an annular edge surface is defined having a right circular conical surface that serves as a back end or second seal. A central bore or hollow cylindrical cavity within the sleeve receives the stem. The sleeve bore is of a slightly smaller diameter than outermost diameter of the stem's forward seal portion to produce a compression between the walls defining the sleeve bore and the stem's forward seal.

In accordance with an additional aspect of the invention an end wall portion of the sleeve contains a seal seat having an inverted frusta conical surface shape of a slightly larger cone angle than the cone angle of the stem's inverted cone shaped edge, forming the second seal. That second seal is oriented facing the sleeve seal seat so as to prepare for a mating engagement. With the sleeve being formed of a more rigid material than the stem, axially pressing the stem against the sleeve wall so that the respective conical shaped portions engage, as occurs when the valve is operated to the full open position, causes the stem edge portion to flare outwardly further and press also against the sleeve bore walls, creating a more effective seal. Further the lip portion of the rim or band forming the third seal remains in compressive contact with the cylindrical sleeve bore walls maintaining a seal there between in all axial positions to which the stem is moved, irrespective of whether or not the stem is positioned in the fully operated or fully opened position.

In accordance with a further aspect of the invention, the sleeve attaches to the valve body by a tapered thread that engages a mating tapered thread formed in the valve body surface, the threads being designed to form therebetween an interference fit, creating a stationary water tight fourth seal in the same manner as a known standard type plug. In such a combination if the thread in the brass body is a straight thread, then the interference fit is attained by the tapered thread on the sleeve.

In accordance with a still further aspect of the invention, the handle is coupled to the sleeve for rotational and axial movement therebetween and is coupled to the stem to rotate and axially move the stem. The sleeve also contains a multi-lead thread on an outer surface, which threads engage a multi-lead thread formed within the inner surface of a depending rim like portion of the handle. This multi-lead thread arrangement allows for quick operation of the valve permitting the valve to be fully opened or closed with as little as a quarter turn of the handle.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DESCRIPTION OF THE DRAWINGS.

In the Drawings:

FIG. 1 is a section view of a preferred embodiment with the elements illustrated in the valve open position;

FIG. 2 is a section view of the same embodiment illustrated with the elements located in the valve closed position;

FIG. 3 illustrates in perspective view and to an enlarged scale the valve stem used within the embodiment of FIG. 1 including its element: the valve seat, the stem forward seal, the stem rear seal, the key section and the mounting hole;

FIGS. 4, 5 and 6 illustrates in section and to an enlarged scale the stem and sleeve of the embodiment of FIG. 1 in a position of being assembled, full closed position and full open position, respectively; and FIG. 7 illustrates in partial section view and to an enlarged scale a portion of one of the seals used in the embodiment of FIG. 1.

DETAILED DESCRIPTION.

Reference is made to FIG. 1 illustrating a preferred embodiment of the novel stop valve in cross section view with the valve in open position and to FIG. 2 showing the same elements with the valve in the closed position, which figures may be considered together. The valve includes a valve body or housing 1, a stem 2, a sleeve 3, a handle 4 and a screw 5. The housing includes a seal seat 6, formed of an axially extending rim to a circular passage located in wall 6a between an inlet opening or bore 7 and a chamber, 6b, located intermediate bore 7, bordered by wall 6a, and outlet bore 8 formed in the valve housing. A cylindrical opening in chamber 6b, containing threads 10 formed on the inner surface, serves to receive sleeve 3, in the housing as more fully discussed hereafter. The valve housing is suitably of a metal material, suitably brass, fabricated by conventional technique. Bores 7 and 8 are adapted to be connected to the respective water supply and water appliance, not illustrated, in a conventional manner, such as by the threads represented on the outer cylindrical surface of the housing portion defining bore 7 and the cylindrical opening defining bore 8.

A sleeve 3 is of a generally cylindrical geometry that has a disk like top section, shown to the right in the figure, forming an end wall that contains a centrally located circular passage or opening; and that also has a second hollow cylindrical section of smaller outer diameter than the end wall, with the second cylindrical section containing a hollow cavity or bore 13 of slightly larger diameter than the central opening, oriented coaxial with the opening in the end wall. The end of the inner wall defining bore 13 has an outward taper 14 that serves as a lead in to permit assembly. The sleeve's end wall contains a seal seat 11 that surrounds the central opening and is later described in greater detail. The second smaller cylindrical section of sleeve 3 contains a tapered outside diameter thread 9 about its outer periphery and the sleeves disk like top section contains a multi-lead thread 12, shown at the right side in the figure, thread 9 permits the sleeve to be screwed into place as illustrated in the figure within chamber 6b, engaging the mating threads 10 located on the internal cylindrical surface of the valve body. Tapered thread 9 is designed to have an interference fit with thread 10. Such provides a water tight seal in the same manner as a conventional tapered water type plug.

Stem 2 is of a generally cylindrical shape with front and back cylindrical portions, suitably of slightly different diameter, and an annular band-like portion, located in between the front and back portions. The band-like portion contains a cylindrical portion that is larger in diameter than the diameter of either the cylindrical front or back portions. At the left end the stem contains a hollow cylindrical cavity or bore 21, defining a rim or annulus 15 that forms the first or main valve seal 15, later described in greater detail. Those skilled in the art recognize that end chamber 21 may be omitted in alternative embodiments with the chamber space being filled with material forming a solid plug like end to the stem, which some may prefer. Stem 2 includes a screw hole passage 19 and a keyed section 18 at the right end. That keyed section is suitably of a hexagonal shape as better illustrated and discussed in FIG. 3. Stem 2 also carries a seal 17 defined by an inverted conical shaped surface and a seal 16 formed by a projecting lip, also of conical shape.

Handle 4 is of an inverted cup-shaped geometry containing a top surface and a peripheral rim depending from the top surface. The handle top surface includes a central axially extending opening or slot that is also of a hexagonal shape which is sized and keyed to the corresponding section of the stem so as to lock or couple the two elements together for joint rotation. Screw 5, suitably a self-taping screw, is fastened into place in stem passage 19 and the wide screw head holds the handle in place. As is apparent to those skilled in the art, other means of coupling or attaching the handle to the stem may be substituted for the hex key-slot and screw so as to preclude relative rotation between the stem and handle, such as a threaded hole and bolt arrangement or by bonding with epoxy as examples, but the disclosed arrangement is preferred. Handle 4 includes a multi-lead thread 20 located on a depending rim portion. This multi-lead thread engages the corresponding lead threads 12 on the stem and thereby allows for quick movement of the valve.

The multi-lead thread may have a very fast pitch, such as two pitches per inch. This allows the valve to open and close in a quarter of a turn. However, if a slower acting valve were required, a single pitched thread, such as an eight turn per inch thread, could be substituted and in which case one full turn would be required to open or close the valve. As those skilled in the art recognize the handle and multi-lead arrangement has served in other valve combinations and serves as well as a part of the disclosed valve.

Reference is made to FIG. 3 which illustrates in perspective view and to an enlarged scale the valve stem incorporated within the embodiment of FIG. 1. As illustrated the valve stem 2 is of a generally elongated cylindrical shape contains a front cylindrical portion 2a, a back cylindrical section 2b of slightly smaller diameter than the front and an intermediate band 2c. It includes the front end seal surface 15 shown to the left, suitably tapered at a 45 degree angle; the key section 18 of a hexagonal "nut" shape and screw passage 19 shown on the right and the protruding band contains a third cylindrical shaped portion 20. In turn the band contains a ring like lip 16 that protrudes outwardly from and extends peripherally about the front cylindrical portion of the stem, the details of which is described in later figures. At the right side the stem member includes a frusta conically shaped edge 17 that serves as a forward seal, extending from the outer surface of the band portion to the surface of cylindrical portion 2b for engaging a seal seat in the sleeve described in greater detail hereafter.

For better understanding of the seals carried by stem 2 and the relationship thereof to sleeve 3, reference is made to FIG. 4 that illustrates the two elements to an enlarged scale in section view with the elements oriented coaxially prior to assembly of the one within the other. For convenience reference may also be made to the corresponding section views of FIG. 5 that shows the orientation of two elements following installation with stem 3 positioned in a first axial position in which the valve is closed as in FIG. 2; and to FIG. 6 which shows the two elements with the stem axially moved to the second or fully open axial position as in FIG. 1. For convenience like elements in these additional figures are denominated by the same reference numerals as in the prior figures.

As illustrated in FIG. 4 with the plastic stem in a "relaxed" uncompressed state, the seal lip 16 is formed of a right circular conical outer surface and a right circular conical inner surface oriented on a common axis that intersect or meet along an angle; the cone edge of the latter, a2, being larger than the cone angle, a1, of the former. Cone angle may be defined as the angle made between the cone axis, a straight line from the imaginary cone base through the apex and the cone wall for a given cone or conical surface or as illustrated the angle between the sloping surface and the axis of stem 2. The section formed describes a lip that is inclined relative to the axis of the stem and sleeve.

With the lead-in 14 being of any convenient taper, such as a radius of 0.01 inches as example, the stem may be inserted along the axis of the sleeve into the defined chamber, from the position illustrated in FIG. 4 to FIG. 5, squeezing or compressing the lip.

To assemble the valve, stem 2 is initially inserted within the sleeve as illustrated in FIG. 5 to couple the two elements. The sleeve 2 is then screwed into place within the valve body. Handle 4 is then screwed over the sleeve by use of the multi-lead threads and in so doing the handle presses against the hex shaped stem end. This allows the hex shaped stem key section to enter within the corresponding hex shaped orifice in the top of the handle. Self tapping screw 5 is then screwed into place to hold the handle to the stem.

When valve 1 is in the normal fully opened position as illustrated in FIG. 1 and handle 4 is turned clockwise to close the valve, the multi-lead threads on the handle's inside rim portion slide within the multi-lead threads 12 of the sleeve; the turning force or torque applied to the handle forces stem 3 to travel from the illustrated position through the sleeve bore to the fully closed sealed position as illustrated in FIG. 2 in which the valve seal surface 15 is pressed against body seat 6. In so doing, the handle and stem are simultaneously moved both axially and rotationally. When the handle is rotated in an anticlockwise from the position illustrated in FIG. 2, stem 2 travels back through sleeve 3 to the full open position, rotating and axially moving. In the full open position, the back end seal 17 of stem 2 engages the sleeve and wall at seat 11.

The stem's seal 17 is of an inverted frusta right circular conical shape as earlier presented in FIGS. 4 and 5 which is better illustrated in the enlarged partial cross section view of FIG. 4c. The sleeve seal seat 11 also contains an inverted frusta right circular conical shape that is of a larger cone angle, b2, as measured between the taper and the vertical than that of the stem backwards seal 17, angle b1. Hence, in this preferred embodiment when the seal portions engage, stem edge portion seal 17, being more resilient than the material of the sleeve, is forced to flare outwardly against the sleeve cylindrical bore wall to attain a tighter seal. The seal 17 engages the sleeve end wall and, in this preferred embodiment, also engages the cylindrical side walls of the sleeve bore.

To the left in FIGS. 2, 4 and 5, sleeve bore 13 contains a lead-in tapered rim portion 14 that allows stem forward seal 16 to enter the sleeve bore along the axis in being assembled. Stem forward seal 16 is of an inverted right circular conical surface shape and is slightly flared. It is slightly larger in diameter than the diameter of sleeve bore 13. When the one is assembled into the other, it creates between the two elements an interference fit; the stem forward seal 16 is placed under compression in sleeve bore 13 thus attaining a positive seal.

The valve is intended to be either in the fully closed or fully opened position for the best positive seal and, hence, water tightness. Any water pressure exerted against stem forward seal 16 causes the seal to engage even more tightly against sleeve bore 13, enhancing the sealing effect. With the valve in the fully closed position as illustrated in FIG. 2, the stem's main valve seal 15 is forced against body seat 6. Stem back end seal 17 is axially displaced from sleeve seal seat 11. Consequently, sealing between the stem and the sleeve is now maintained solely by stem forward seal 16, which engages the inside diameter of sleeve bore 13. Typically in a water installation, the sink pipe is connected to outlet bore 8 and contains a small amount of standing water. However, inlet bore 7 is connected to the main water supply lines, which is usually under greater pressure. Seal 16 forms a seal sufficient to withstand the pressure of the standing water and, hence, prevent leakage through the back end of the stem. Moreover, if the inlet pressure increases greatly, the seal between seal portion 16 and sleeve 3 is enhanced making it even less likely that standing water can escape through the outer periphery of the stem.

Though containing five elements in total, the valve includes four seals, three of which are formed in and carried by the stem and are movable: the seal of the sleeve by the tapered thread to the valve body; the stem forward seal that seals around the sleeve bore; the stem back end seal which engages the sleeve seal seat when the valve is in the full open position; and the stem to front end stem seal which engages the body when the valve is in the full closed position.

The handle, sleeve and stem are preferably each made of a plastic material, each preferably being of a different polymer. For example, the handle is formed of a rigid plastic, such as ABS; the sleeve is formed of another rigid plastic material, such as Acetal, that has the advantage of providing a self-lubricating quality that allows the threads to work more smoothly, avoiding binding between the sleeve and handle and also allows the stem to slide more smoothly back and forth in the sleeve bore during operation; and the stem is made of a more compliant plastic material, such as a copolymer polypropylene, which allows slight compression in the seal areas. Acetal also does not absorb water. Hence, the integrity of the sleeve dimensions are maintained over time. Suitably the three elements are formed by conventional plastic molding processes and are each unitary one-piece assemblies.

The design of the stem and the seals integrally formed thereon provides a one-piece assembly of novel design and simplifies the construction of a stop valve. Labor and parts inventory requirements are reduced. An advantage of the invention is that the stop valve structure does not require use of any O-rings between the stem and the valve sleeve to attain a water tight seal, although retaining the quality of being quick acting in operation. Moreover, an additional positive seal is provided even with the valve in the fully open condition, preventing escape of water. It is also seen that no O-ring seals whatsoever are used in the illustrated embodiment. As those skilled in the art appreciate alternative embodiments of the invention may employ different structural means to connect the valve stem to the valve body in a fluid tight relationship other than by use of the interference fit thread type arrangement or in combination with such kind of fit without departing from the scope of the present invention.

In one practical embodiment of the invention, stem 2 is of a length of 1.085 inches, the outer diameter of the front and back cylindrical stem portions were 0.390 and 0.375 inches, respectively, the diameter of the middle band was 0.466 inches and the outermost diameter of seal lip 16 was 0.476 inches. The length of the band was 0.130 inches. The stem bore 21 was of a diameter of 0.215 inches and the thickness of the annular portion surrounding bore 21 was 0.070 inches. Further the inner diameter of the body seat 6 was 0.350 inches and its midpoint diameter 0.410 inches.

The sleeve bore was of a diameter of 0.470 inches, approximately 0.006 inches smaller in diameter than the sleeve seal 16, and the length of that bore was 0.350 inches. The stem was moved along the axis from the full open position to the full closed position, a distance of 0.130 inches, which is less than the length of the sleeve bore. The sleeve side wall opening 0.400 inches diameter, which left a clearance with the back cylindrical portion of the stem.

It is believed that the foregoing description of the preferred embodiment of the invention is sufficient in detail to enable one skilled in the art to make and use the invention. However, it is expressly understood that the details of the elements which are presented for the foregoing enabling purpose is not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. An improved stop valve comprising in combination: a valve sleeve and a one piece unitary stem formed of resilient compressible plastic material; said valve sleeve containing interior walls defining a passage for receiving at least a portion of said stem and an end wall for preventing removal of said stem from the end thereof containing said end wall; and said end wall containing a passage therethrough; said stem including first, second and third seal means, and said stem being fitted within, extending through and movable in said valve sleeve; manual force applying means for moving said stem axially between a first axial position in which the valve is fully closed and a second axial position in which the valve is fully open; said first seal means being operative to provide a seal responsive to said stem means being in said first axial position to close the valve with said third seal means being inoperative to provide a seal responsive to said stem means being in said first axial position; said third seal means being operative to seal said passage when said third seal means engages at least said end wall of said sleeve responsive to said stem means being in said second axial position with said first seal means being inoperative to provide a seal responsive to said stem means being in said second axial position, and said second seal means being operative to provide a seal to said interior walls of said sleeve in all axial positions of said stem between and including said first and second axial positions.

2. The invention as defined in claim 1 further comprising: a valve housing; and means mounting said sleeve in sealed relationship to said valve housing.

3. The invention as defined in claim 2 wherein said means for mounting said sleeve to said valve housing comprises: thread means formed on said sleeve and thread means in said housing assembly, with said sleeve thread means matingly engaging said housing thread means in an interference water tight fit.

4. The invention as defined in claim 2 wherein each of said first and third seal means comprises a right circular frusta conical surface geometry.

5. The invention as defined in claim 1 wherein said manual force applying means comprises a grippable handle coupled to said stem and to said sleeve for simultaneously rotating and axially moving said stem with respect to said sleeve; and wherein said handle comprises an inverted cup like geometry having a top surface and a rim like portion depending from said top surface to define a cavity; thread means formed in said inside surface of said rim like portion and extending about the periphery of said inner surface of said rim like portion of said handle; and key slot means extending through said top surface; and further comprising: coupling means attaching said handle to said stem to permit joint rotation of said handle and said stem, said coupling means comprising: a key and slot means for preventing rotation between said handle and said stem with said key formed in said stem and engaging said key slot means in said handle; and screw means for fastening said handle to said stem to prevent axial relative movement therebetween.

6. The invention as defined in claim 4 further including means coupling said handle to said sleeve for rotation and axial movement with respect to said sleeve, said means comprising: thread means.

7. The invention as defined in claim 5 wherein said thread means comprises further multi-lead threads.

8. The invention as described in claim 1 wherein said valve sleeve is formed of a relatively rigid incompressible non-water absorbent self lubricating plastic material.

9. The invention as defined in claim 1 wherein said valve sleeve comprises the material Acetal; and wherein said stem plastic material comprises polypropylene and wherein said valve sleeve comprises the material Acetal.

10. The invention as defined in claim 1 wherein said stem plastic material comprises polypropylene and wherein said valve sleeve comprises the material Acetal.

11. The invention as defined in claim 12 wherein said handle comprises a plastic material having a relatively rigid characteristic.

12. The invention as defined in claim 1 wherein said second seal means comprises a lip, said lip being outwardly protruding and containing an inverted right circular conical outer surface and an inverted right circular conical inner surface with the cone angle of said inner surface being larger than the cone angle of said outer surface to define a taper.

13. The invention as defined in claim 12 wherein said second seal means comprises a lip, said lip being outwardly protruding and containing an inverted right circular conical outer surface and an inverted right circular conical inner surface with the cone angle of said inner surface being larger than the cone angle of said outer surface to define a taper.

14. An improved stop valve comprising in combination: a valve sleeve; a valve housing; and means mounting said valve sleeve in sealed relationship to said valve housing; a one piece unitary stem formed of resilient compressible plastic material; said valve sleeve containing interior walls forming a passage and an end wall for preventing removal of said stem from the end thereof containing said end wall; and with said end wall containing a passage therethrough; said stem including first, second and third seal means, and said stem being fitted within, extending through and moveable in said valve sleeve; manual force applying means for moving said stem axially between a first axial position in which the valve is fully closed and a second axial position in which the valve is fully open; said first seal means being operative to provide a seal responsive to said stem being in said first axial position to close said valve and with said third seal means being inoperative to provide a seal responsive to said stem being in said first axial position; said third seal means being operative to provide a seal at said end wall responsive to said stem being in said second axial position in which said valve is fully open and with said first seal means being inoperative to provide a seal responsive to said stem being in said second axial position, and said second seal means being operative to provide a seal to said interior walls of said sleeve in all axial positions of said stem between and including said first and second axial positions; wherein said third seal means further comprises an inverted frusta conical surface geometry; and wherein said valve sleeve contains a seal seat located in said end wall, said seal seat comprising a frusta conical geometry; said third seal means being oriented to matingly engage said seal seat responsive to said stem being in said second axial position; said third seal means having a predetermined cone angle and said seal seat having a cone angle that is larger than said corresponding cone angle of said third seal means.

15. The invention as defined in claim 14 wherein said second seal means comprises a lip, said lip being outwardly protruding and containing an inverted right circular conical outer surface and an inverted right circular conical inner surface with the cone angle of said inner surface being larger than the cone angle of said outer surface to define a taper.

16. A unitary valve stem adapted to be installed within and extend through a valve sleeve bore for movement between an open and closed position, comprising in combination: an elongate one-piece molded member of a resilient compressible plastic material having front and back ends and being of a predetermined length, said member including tubular shaped front and back portions proximate said respective front and back ends and a generally cylindrical band like portion located in between and coaxial with said front and back tubular portions; said front end of said front portion having a taper defining a first seal; said band like portion protruding outwardly from the cylindrical surface of said front and back tubular portions and containing first and second end edges, with said band like portion being of a height measured along said length thereof that is less than the length of said sleeve bore, said first edge oriented toward said front end of said member and defining a second seal and said second end edge oriented toward said back end of said member to define a third seal; said first edge of said generally cylindrical band like portion defining a tapered lip, with said lip generally radially outwardly projecting from and peripherally extending about the surface thereof with the outer diameter of said lip being greater, slightly, than the inner diameter of said sleeve bore for producing a compressive force on the walls of said sleeve bore responsive to said sleeve being inserted within said sleeve bore; said second edge of said generally cylindrical member comprising: a surface having a frusta conical shape for engaging at least a portion of the valve sleeve bore to provide a seal when said valve stem is in the open position; and torque coupling means located at said second tubular portion of said member.

17. The invention as defined in claim 17 wherein said lip is located bordering said first end edge of said band like portion.

18. The invention as defined in claim 17 wherein said third seal means is located within said lip and comprises a conical outer surface on said lip.

19. A stop valve comprising:
a valve body;
said valve body containing an inlet bore, an outlet bore and a chamber with said chamber located intermediate said inlet and outlet bores, said chamber including:
  a chamber wall separating said chamber from said inlet bore with said chamber wall containing a passage and a seal seat, with said seal seat being located peripheral of said passage;
  a valve sleeve receiving passage, said valve sleeve receiving passage containing threads located on an inner surface of said sleeve receiving passage;
valve sleeve means;
said valve sleeve means including:
  a circular shaped end wall having a circular opening of a first predetermined diameter defining an axially extending passage with said circular opening being centrally located in said end wall;
  an axially extending hollow cylindrical cavity of a second predetermined diameter and length, with said second predetermined diameter being greater than the diameter of said circular opening; and a first cylindrical outer peripheral portion with said cylindrical outer peripheral portion containing threads for matingly engaging said internal threads of said valve sleeve receiving passage to form an interference fit therebetween;

valve stem means; said valve stem means being located within and extending through said hollow cylindrical cavity and said passage in said sleeve means, said valve stem means comprising:

an elongated one-piece molded member of a complaint plastic material, with said member having first and second ends and being of a predetermined length therebetween and including integrally therein:

first, second and third seal means located spaced from one another along the length thereof with said second seal means being located between said first and third seal means; and torque coupling means located at said second end thereof;

hand grippable handle means for moving said stem means;

first coupling means coupling said handle means to said valve stem torque coupling means and second coupling means rotatably coupling said handle means to said sleeve means;

said stem means being responsive to rotation of said handle means in one rotational direction for axially moving in a first direction for permitting said first seal means to engage said chamber seal seat to close a fluid path between said inlet and outlet bores and responsive to rotation of said handle means in an opposite rotational direction for axially moving said stem means in the opposite direction to disengage said first seal means from said chamber seal seat to open said fluid path between said inlet and outlet bores and permit said third seal means to engage said end wall of said sleeve means to seal said circular end wall opening when the first seal means is disengaged with said second seal means being maintained in sealing engagement with said cylindrical bore wall of said sleeve means irrespective of the direction of axial movement; and fastener means for fastening said handle means to said stem means.

20. The invention as defined in claim 19 wherein said second seal means comprises:

a circumferentially extending lip for compressively engaging said cylindrical walls of said hollow cylindrical passage in said sleeve means, said lip formed integrally within said stem and extending in a circle of a diameter, DL, with said diameter DL being slightly larger than the inner diameter of said hollow cylindrical cavity of said sleeve means to cause compressive engagement with said walls of said valve sleeve means upon assembly into said valve sleeve means; said lip further including a right circular conical outer surface of a first cone angle and right circular conical inner surface of a second cone angle, with the latter cone angle being larger than the former cone angle to define a taper.

21. The invention as defined in claim 20 wherein said valve sleeve means includes a radially outwardly tapered edge located at the front end of said hollow cylindrical cavity for permitting said valve stem means to be more easily received within said hollow cylindrical cavity.

22. A stop valve comprising:

a valve body;

said valve body containing an inlet bore, an outlet bore and a chamber with said chamber located intermediate said inlet and outlet bores, said chamber including:

a chamber wall separating said chamber from said inlet bore with said chamber wall containing a passage and a seal seat, with said seal seat being located peripheral of said passage;

a valve sleeve receiving passage, said valve sleeve receiving passage containing threads located on an inner surface of said sleeve receiving passage;

valve sleeve means;

said valve sleeve means including:

a circular shaped end wall having a circular opening of a first predetermined diameter defining an axially extending passage with said circular opening being centrally located in said end wall; said sleeve means end wall including a seal seat formed about said sleeve means central opening, said seal seat being of a right circular conical shaped surface;

an axially extending hollow cylindrical cavity of a second predetermined diameter and length, with said second predetermined diameter being greater than the diameter of said circular opening; and a first cylindrical outer peripheral portion with said cylindrical outer peripheral portion containing threads for matingly engaging said internal threads of said valve sleeve receiving passage in said valve body to form an interference fit therebetween;

valve stem means; said valve stem means being located within and extending through said hollow cylindrical cavity and said passage in said sleeve means, said valve stem means comprising:

an elongated one-piece molded member of a compliant plastic material, with said member having first and second ends and being of a predetermined length therebetween and including integrally therein:

first seal means located at said first end thereof;

second seal means; and third seal means located spaced from said first end thereof and from said second seal means; with said second seal means located at an position along the length of said member between said first and second ends; and torque coupling means located at said second end thereof;

hand grippable handle means for moving said stem means;

first coupling means coupling said handle means to said valve stem torque coupling means and second coupling means rotatably coupling said handle means to said sleeve means;

said stem means being responsive to rotation of said handle means in one rotational direction for axially moving in a first direction to close a fluid path between said inlet and outlet bores and responsive to rotation of said handle means in an opposite rotational direction for axially moving said stem means in the opposite direction to open a fluid path between said inlet and outlet bores; and fastener means for fastening said handle means to said stem means;

said first seal means being adapted to engage said valve body seal seat means to prevent fluid from passing between said inlet bore and said outlet bore responsive to said stem means being located in a first axial position, whereby said valve is closed;

said third seal means being adapted to engage said seal seat of said end wall of said sleeve means responsive to said stem means being located at a second axial position furthermost opposite said first axial position, whereby leakage is prevented when the valve is open; and said second seal means being adapted to engage said cylindrical bore wall of said sleeve means cavity at every axial position of said stem means between and including said first and second axial positions to assist in preventing leakage when the valve is at least partially open.

23. The invention as defined in claim 22 wherein said sleeve means comprises a water nonabsorbent self lubricating relatively rigid plastic material; said plastic material being less compliant than said material of said stem means.

24. The invention as defined in claim 22 wherein said sleeve means material comprises Acetal.

25. The invention as defined in claim 22 wherein said stem means comprises a compressible material and wherein said valve sleeve means comprises a relatively rigid material, said material being more rigid than said stem means material; wherein said third seal means includes a frusta conical surface; and wherein said frusta conical shape of said third seal means of said stem means is of a first cone angle and said frusta conical shape of said seal seat in said valve sleeve means is of a second cone angle, with said second cone angle being greater than said first cone angle, whereby said third seal means is forced to flare outwardly responsive to pressing axially directed engagement of said stem means with said sleeve means seal seat.

26. The invention as defined in claim 25 wherein said threads of said cylindrical outer peripheral portion of said valve sleeve means comprises a first predetermined pitch; and wherein said sleeve means further includes: a second cylindrical shaped outer peripheral portion located adjacent said first cylindrical outer peripheral portion, with said second cylindrical shaped peripheral portion containing threads of a second predetermined pitch; and wherein said second predetermined pitch is less than said first predetermined pitch.

27. The invention as defined in claim 28 wherein said handle means includes a rim portion and wherein said second coupling means comprises thread means located on an internal surface of said handle rim portion for matingly engaging said thread means of said second cylindrical shaped outer peripheral portion of said sleeve means.

28. A unitary valve stem adapted to be installed within and extend through a valve sleeve bore of diameter D and an axial length L for movement between an open and closed position, comprising:

an elongate one-piece molded member of a resilient compressible plastic material, said elongate member including:
  first and second ends and being of a predetermined length, L1;
  first and second generally cylindrically shaped portions of respective diameters D1 and D1B; and
  a third portion located between and adjacent said first and second cylindrical portions, said third portion including a cylindrical shaped section having a second predetermined diameter, D2, where D2 is slightly larger than the diameter of said first and second cylindrical portions, to define a raised band, and said third portion being of a predetermined length L2, where L2 is less than L1;
  said third portion defining first and second annular edges at the first and second ends, said edges respectively, bridging the outer surface thereof to the surface of said respective adjacent first and second cylindrical portions;
  said third portion further including a lip located bordering said first edge thereof, with said lip outwardly projecting from and peripherally extending about said surface coaxial with said first cylindrical shaped portion to form a seal surface, said lip having a right circular conical outer surface and with the outer diameter of said lip, D3, being greater slightly than D2 and being slightly greater than said D, the inner diameter of said sleeve bore, whereby a compressive force is produced between said lip and said sleeve bore responsive to said stem being installed in said sleeve bore;
  said second annular edge being oriented facing toward said second end of said member with said second annular edge having an inverted frusta conical shape to define a seal surface for engaging at least a portion of the valve sleeve bore to provide a seal when the valve stem is in the open position;
  said first cylindrical portion including an end surface forming a seal surface; and
  said second end of said member including torque coupling means for coupling a torque thereto.

29. The invention as defined in claim 28 wherein said lip further comprises an inverted right circular conical inner surface with the cone angle of said inner surface being greater than the cone angle of said outer surface.

30. The invention as defined in claim 28 wherein said torque coupling means comprises a key of hexagonal shape.

31. The invention as defined in claim 30 wherein said member further includes a first passage, said first passage extending a predetermined distance from said second end with said first passage being adapted to receive a fastener means.

32. A stop valve comprising:
a valve body;
said valve body containing an inlet bore, an outlet bore and a chamber intermediate said inlet and outlet bores, said chamber including:
  a chamber wall separating said chamber from said inlet bore with said chamber wall containing a passage and a seal seat, with said seal seat being located peripheral of said passage;
  a valve sleeve receiving passage spaced from said inlet and outlet bores with said valve sleeve receiving passage containing internal threads;
sleeve means;
said sleeve means being formed of a relatively rigid non water absorptive slippery plastic material and including:
  a circular shaped end wall having a circular opening of a first predetermined diameter, DW, defining an axially extending passage with said circular opening being centrally located in said end wall;

said end wall including a seal seat bordering said opening, said seal seat being of a right circular conical surface shape;

an axially extending hollow cylindrical cavity of a second predetermined diameter, DC, and of a length, LC; said second diameter DC being greater than the diameter DW of said circular opening; and a cylindrical shaped peripheral outer surface portion with said cylindrical shaped outer surface peripheral portion containing a first thread for matingly engaging said internal threads of said valve sleeve receiving opening in said housing and forming an interference fit therebetween;

valve stem means, comprising:

an elongate one-piece molded member of a resilient compressible plastic material, said elongate member including:

first and second ends and being of a predetermined length, LS;

first and second generally cylindrically shaped portions of diameter DS1 and DS2, respectively; and a third band portion, located between and adjacent said first and second cylindrical portions, said third portion including a cylindrical section being of a diameter, DS3, where DS3 is slightly larger than said diameter DS2, to define a raised band portion, and said third band portion being of a predetermined length LB, where LB is less than LS;

said third band portion defining first and second annular edges bridging the top and bottom ends, respectively, of the outer surface thereof to said respective adjacent first and second cylindrical portions;

said first annular edge facing toward said second end and having an inverted frusto conical shape to define a seal surface for engagement with said seal seat of said sleeve means;

said second annular edge including a lip, with said lip outwardly projecting from and peripherally extending about said first cylindrical portion, said lip having a right circular conical shaped outer surface and an inverted right circular shaped inner surface with the cone angle of said inner surface being greater than the cone angle of said outer surface and with the outer diameter of said lip, LL, being greater slightly than DS3 and being slightly greater than said DS, the inner diameter of said sleeve bore, whereby a compressive force is produced between said lip and said sleeve bore cavity responsive to said stem being located within said sleeve cavity;

said first cylindrical portion including an annular edge at said first end of said member; said annular edge having a tapered shape to form a seal for engaging said seal seat in said chamber wall; and said second end of said member including coupling means for coupling a torque thereto;

hand grippable handle means for turning said stem means, said handle means having coupling means for coupling to said valve stem torque coupling means and preventing relative rotational movement therebetween; said handle means including a top surface and a annular rim portion depending from said top surface; said handle means rim portion containing a multi-lead thread on an inner surface thereof;

said multi-lead thread on said handle means rim portion being in operative mating engagement with said multi-lead thread on said sleeve means, whereby rotation of said handle means causes said handle means to move axially of said sleeve means;

said stem means being responsive to rotation of said handle means in one rotational direction for axially moving within said hollow cavity in a first direction to move said annular edge of said first cylindrical portion into sealing engagement with said seal seat in said chamber wall and close a fluid path between said inlet and outlet bores and being responsive to rotation of said handle means in an opposite rotational direction for axially moving said stem means in the opposite direction to withdraw said first seal means from contact with said seal seat in said chamber wall to open a fluid path between said inlet and outlet bores and for moving first annular edge of said third cylindrical portion of said stem means into engagement with said seal seat in said sleeve means wall to produce a sealing engagement therebetween and with said lip of said third cylindrical portion maintaining sealing engagement with the walls of said sleeve means hollow cylindrical cavity; and screw means for fastening said handle means to said stem means.

33. The invention as defined in claim 32 wherein the diameter of said first cylindrical portion of said stem is greater than the diameter of said second cylindrical portion of said stem.

* * * * *